United States Patent [19]

Schwitters

[11] 4,203,461
[45] May 20, 1980

[54] FREEZER DOOR FOR A SOFT-SERVE FREEZER

[75] Inventor: Stephen W. Schwitters, Rockford, Ill.

[73] Assignee: Beatrice Foods Co., Chicago, Ill.

[21] Appl. No.: 967,961

[22] Filed: Dec. 11, 1978

[51] Int. Cl.² .................... F16K 31/60; F16K 1/00; F16K 31/44; A23G 9/00
[52] U.S. Cl. .................... 137/343; 251/324; 251/290; 403/359; 62/342; 251/231
[58] Field of Search .............. 62/342; 251/231, 236, 251/237, 324, 290; 222/509, 505, 559; 403/359; 137/269, 343; 49/460

[56] References Cited

U.S. PATENT DOCUMENTS

| 789,855 | 5/1905 | Hennebohle | 251/236 |
|---|---|---|---|
| 1,614,117 | 1/1927 | Geldhof | 251/236 |
| 2,188,783 | 1/1940 | Voight | 251/231 |
| 3,081,920 | 3/1963 | Gorychka | 222/509 |
| 3,145,968 | 8/1964 | Marx | 251/242 X |
| 3,547,404 | 12/1970 | Blackburn et al. | 251/291 X |
| 3,582,116 | 6/1971 | Young | 403/359 |
| 3,698,206 | 10/1972 | Werner | 251/324 X |
| 3,934,427 | 1/1976 | Keyes | 251/324 X |
| 3,965,528 | 6/1976 | Kissler | 403/359 X |
| 4,080,123 | 3/1978 | Melchinger | 403/359 X |

*Primary Examiner*—Martin P. Schwadron
*Assistant Examiner*—A. Michael Chambers
*Attorney, Agent, or Firm*—Morsbach & Pillote

[57] ABSTRACT

A freezer door for a soft-serve freezer in which the door has a valve cylinder and a valve member slidable in the cylinder. A valve actuator is pivotally supported in a pair of bearings at the front of the door and the valve actuator is formed in two parts, with a first actuator part comprising a first shaft member rotatably supported in one of the bearings and having an internally splined socket and a lateral valve engaging member at one end, and a second actuator part comprising a second shaft member rotatably supported in the other of the bearings and having an externally splined end portion at one end non-rotatably received in the socket in the first shaft member and a lateral handle at its other end. The first and second actuator parts can be reversibly mounted on the door for left or right hand operation.

5 Claims, 5 Drawing Figures

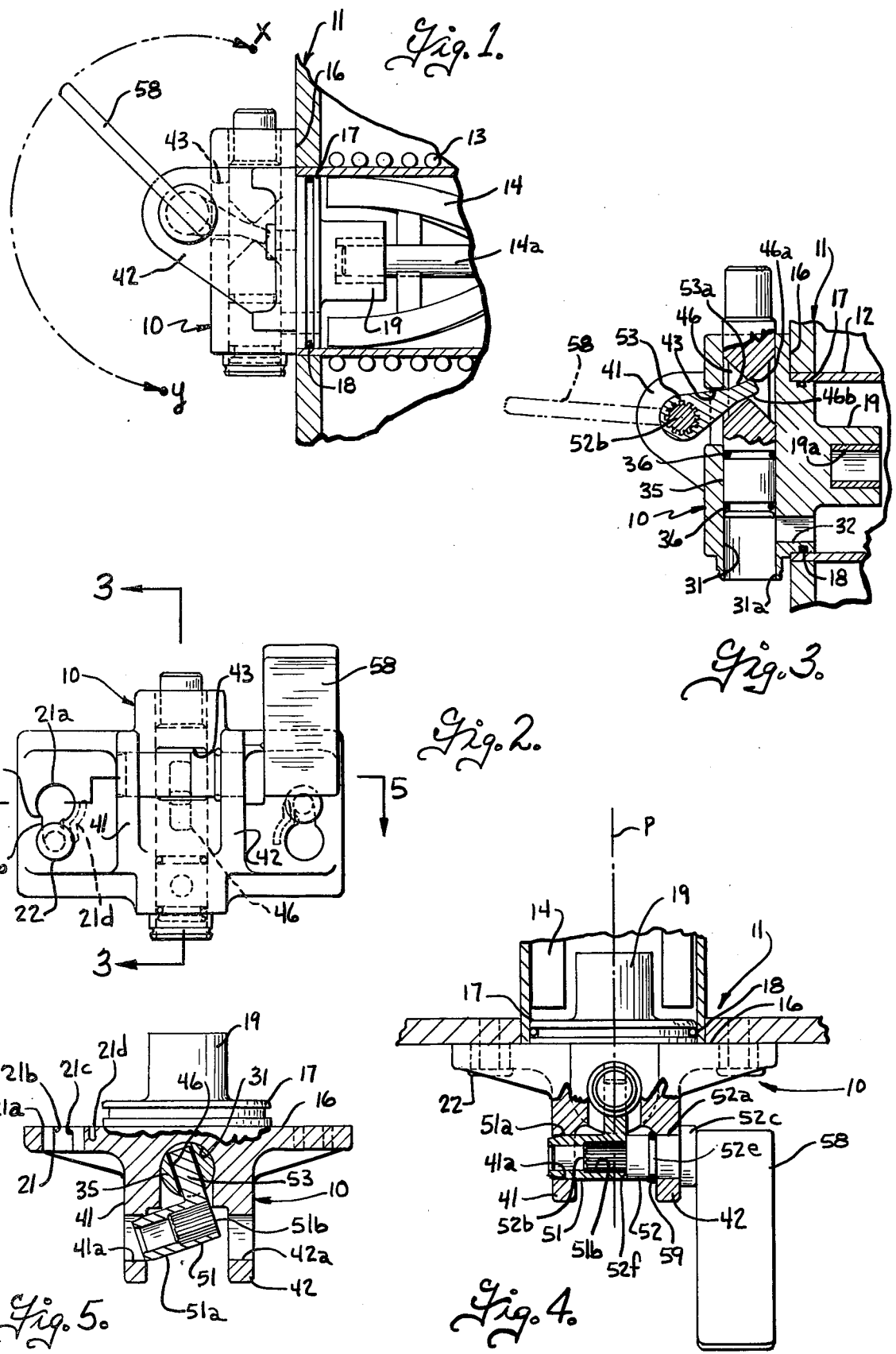

FREEZER DOOR FOR A SOFT-SERVE FREEZER

BACKGROUND OF THE INVENTION

The present invention relates generally to a freezer door for a soft-serve freezer of the type which includes a valve cylinder, a valve member slidable in the valve cylinder and a manually operable valve actuator pivotally mounted on the door and engaging the valve member to slide the same in the cylinder. It is common practice, for example as shown in U.S. Pat. Nos. 3,081,920; 3,698,206 and 3,934,427 to make the valve actuator including the valve engaging member and the handle member in one piece and to pivotally mount the one-piece valve actuator on a rod or pin so that the handle is movable along a path in front of the valve cylinder. With this arrangement, the hand that operates the handle tends to obstruct the operator's view of the cup being filled. Further, it is sometimes desired in different installations and by different operators to provide a different mode of operating the valve operating handle to open the valve. Thus, some may desire that the handle be arranged to open the valve in response to pulling the handle forwardly and downwardly while others may desire that the valve be opened in response to pushing the handle downwardly and rearwardly and still others may desire that the handle be operated in different intermediate modes. The one-piece valve actuators were not adjustable to enable changing the handle operating mode.

SUMMARY OF THE INVENTION

An important object of the present invention is to provide a freezer door for a soft-serve freezer having a dispensing valve and a manually operable valve actuator, in which the handle of the valve actuator is mounted for movement in a plane offset to one side of the valve cylinder so that it does not obstruct the operator's view of the dispensing operation.

Another object of this invention is to provide a freezer door for a soft-serve freezer having a dispensing valve and a manually operable valve actuator in which the mode of operating the handle of the valve actuator can be changed.

Another object of these invention is to provide a freezer door for a soft-serve freezer having a dispening valve and a manually operable valve actuator in which the operating handle for the valve actuator can be located at either the right or left side of the valve for right or left hand operation.

Accordingly, the present invention provides in a freezer door for a soft-serve freezer of the type including a valve cylinder in the door a valve member slidable in the valve cylinder, a pair of spaced actuator supports at the front of the door, and a manually operable valve actuator pivotally mounted on the spaced actuator supports, an improved valve actuator including a first shaft member having a pivot portion rotatably received in an opening bearing in one of the actuator supports and an actuator member extending laterally from the first shaft member for engagement with the valve member, and a second shaft member having a pivot portion rotatably received in a bearing opening in the other actuator support and a handle extending laterally from the second shaft member, and shaft connecting means on the adjacent ends of the first and second shaft members to non-rotatably interconnect the same.

These, together with other objects and features and advantages of the present invention will be more readily understood by reference to the following detailed description, when taken in connection with the accompanying drawings wherein:

FIG. 1 is a fragmentary sectional view through a soft-serve freezer and having the freezer door of the present invention applied thereto;

FIG. 2 is a front elevational view of the freezer door of FIG. 1;

FIG. 3 is a vertical sectional view taken on the plane 3—3 of FIG. 2;

FIG. 4 is a top plan view of the freezer door with parts broken away to illustrate details of construction; and FIG. 5 is a fragmentary horizontal sectional view taken on the plane 5—5 of FIG. 2 and illustrating assembly of the valve actuator on the door.

The present invention relates to a freezer door 10 for a soft-serve freezer 11. Such soft-serve freezers are old and well known and in general include a freezer cylinder 12 which is refrigerated by a refrigerating mechanism including an evaporator coil 13. Product to be frozen, usually containing liquid and gaseous ingredients, is supplied to the freezing cylinder. A product supply apparatus (not shown) and a motor driven agitator 14 is provided in the freezing cylinder for removing a frozen product from the walls of the freezing cylinder and for mixing and agitating the product in the cylinder to a uniform consistency. The door 10 is mounted at the discharge end of the freezing cylinder and contains a dispensing valve and dispensing valve actuator.

The door is conveniently molded of synthetic resin material and may, for example, by formed of polyterephthalate, it being understood that other materials could be used if desired. The door 10 is adapted for mounting on the front of the soft-serve freezer 11 to extend across the discharge end of the freezing cylinder 12 and in the embodiment illustrated, the door has a rear face 16 adapted to overlie the front of the soft-serve freezer around the freezing cylinder and an annular portion 17 that projects rearwardly from the face 16 and is dimensioned for reception in the discharge end of the freezing cylinder. An O-ring 18 is mounted in a groove in the annular portion 17 to seal the interface between the door and the freezing cylinder. A boss 19 is provided at the inner side of the door and has a bearing 19a therein for rotatably supporting the forward end of the shaft 14a of the agitator 14. The door is detachably secured to the front of the soft-serve freezer 11 and, in the embodiment shown, the door is provided with keyhole shaped openings 21 adapted to receive headed pins 22 on the front of the soft-serve freezer. As best shown in FIG. 2, the keyhole shaped openings 21 have enlarged ends 21a dimensioned to allow the head portion of pin 22 to pass there-through and a reduced end portion 21b dimensioned to receive the shank portion of a pin. The keyhole shaped openings are disposed concentric with the axis of the angular portion 17 on the door and are arranged in relatively opposite directions so that the annular portion 17 of the door can be positioned in the end of the freezing cylinder with the enlarged ends 21a of the keyhole shaped openings in registry with the pins 22, and the door can be turned to its locked position shown in FIG. 2. A detent 21c is provided at one side of the keyhole opening at a location spaced from the closed end of the reduced end portion 21b to engage the shank of the headed pin and realeasably lock the door in its FIG. 2 position. A recess indicated at 21d is advantageously provided in the rear side of the door alongside the keyhole opening to facilitate flexing of the intermediate wall portion of the door as the shank of the pin passes over the detent 21c during installation and removal of the door.

The door has an upright valve cylinder 31 formed therein and the valve cylinder is open at its lower end to provide a discharge outlet 31a. A product inlet passage 32 is formed in the door and communicates with the valve cylinder above its discharge end and extends through the inner side of the door to communicate with the freezing cylinder. A valve member 35 is slidable in the valve cylinder 31 to control flow of product from the product inlet to the discharge outlet and the valve member is movable between a raised position as shown in FIG. 3 above the product inlet and a lower position as shown in FIG. 1 blocking flow from the product inlet to the product outlet. Means such as a pair of O-rings 36 are mounted on the valve member at locations axially spaced apart to disposed above and below the product inlet when the valve member is in its lowered position shown in FIG. 1.

The valve member is raised and lowered by a manually operable valve actuator. The door has a pair of flanges 41 and 42 that project forwardly from the door and are spaced from relatively opposite sides of a plane P (FIG. 5) through the longitudinal axis of the valve cylinder, and the flanges have aligned bearing openings 41a and 42a therein that are offset forwardly from the valve cylinder. The door has an opening 43 between the flanges 41 and 42 for receiving a valve actuator and the valve member has an actuator passage 46 spaced above the O-rings 36 for receiving the valve actuator. As best shown in FIG. 3, the actuator passage 46 extends completely through the valve member and is shaped to define opposed fulcrum faces 46a and 46b that are spaced apart in a direction axially of the valve member. Fulcrum faces 46a and 46b are preferably located in a plane through the longitudinal centerline of the valve member.

The valve actuator includes a first shaft member 51 having a pivot portion 51a at one end adapted to be rotatably received in one of the bearings such as 41a and an actuator member 53 that extends laterally from the other end of the shaft member for engagement with the valve member 35. The shaft 51 and actuator 53 are molded in one piece preferably of a synthetic resin material, and the shaft member 51 has an internally splined socket portion, 51b at the end adjacent the actuator 53. As best shown in FIGS. 3 and 5, the actuator 53 has a nose portion 53a dimensioned to extend into the actuator passage 46 in the valve member and between the fulcrum faces 46a and 46b. The opening 43 in the door for receiving the actuator is made sufficiently high to allow swinging movement of the actuator between a raised position as shown in FIG. 3 and a lowered position, and the opening 43 is also made substantially wider than the horizontal width of the actuator 53 to facilitate installation of the shaft 51 and actuator 53 on the door. The shaft 51 has a length somewhat less than the spacing between the flanges 41 and 42, but greater than one-half the spacing between the flanges. The actuator and shaft can be installed on the valve and door by first inserting the actuator 53 into the valve member while positioning the end of the shaft 51 in one of the bearing openings 41a as shown in FIG. 5. The shaft 51 can then be guided into the bearing opening to the position shown in FIG. 5, and the valve member turns about its axis in the valve cylinder to accommodate the change in angularity.

The valve actuator also includes a second shaft 52 having a pivot portion 52a intermediate its ends and an externally splined end portion 52b demensioned to be rotatably received in the internally splined socket 51b in the shaft 51. The shaft 52 has a laterally extending handle 58 at the end remote from the externally splined end portion 52b. The shaft 52 and handle 58 are molded in one piece, preferably of synthetic resin material, and the shaft has a collar 52c intermediate the pivot portion 52a and the handle 58, which collar is adapted to engage one of the flanges 42 at its outer side. A retaining means such as an O-ring 59 is adaptably mounted in a groove 52e on the shaft 52 to releasably retain the shaft in the bearing opening. A shoulder 52f on the shaft 52 is arranged to engage the end of the shaft 51.

The handle 58 on the valve actuator is offset to one side of the plane P through the valve axis so that operation of the handle 58 by the hand of the operator does not obscure the dispensing operation. As shown, the handle 58 is offset to the right of the plane P for right hand operation. However, bearing openings 41a and 42a are advantageously formed with a like internal diameter and the pivot portions 51a and 52a on the shafts 51 and 52 are also formed with a like external diameter so that the shafts 51 and 52 can be reversed end for end with the handle 58 at the left side of the valve for left hand operation. The internally splined connection between the shafts 51 and 52 not only non-rotatably connects the shafts but also allows the relative angular position of the shafts to be adjusted through a number of different positions to enable adjustment of the angularity of the handle during movement of the valve member between its open and closed position. Thus, the handle 58 can be angulary adjusted in small increments relative to the actuator member 53 such that the handle 58 will be normally positioned at selected different points between X and Y along the arc shown in phantom in FIG. 1, when the valve member is closed. For example, when the handle is normally positioned adjacent the point X, it can be manually operated by pulling it forwardly and when the handle is normally positioned intermediate points X and Y, it can be operated by pushing or pulling downwardly, and when the handle is positioned adjacent the point Y, it can be operated by pushing it rearwardly.

From the foregoing it is thought that the construction and operation of the freezer door, dispensing valve and actuator therefor will be readily understood. The two-piece actuator can be easily formed by molding from plastic or the like and can be easily installed on the door and valve with the handle at either the left or at the right side of the valve, for left or right hand operation as desired. Further, the handle can be angularly adjusted to change its normal position when the valve is closed. When installed, the operating handle is laterally offset from the valve members so that manipulation of the handle to operate the valve does not obscure the dispensing operation.

The embodiments of the invention in which an exclusive property or privilege is claimed are defined as follows:

1. In a freezer door for a soft-serve freezer including a valve cylinder in the door having a product inlet and a product outlet, a valve member slidable in the valve cylinder to control flow from the product inlet to the product outlet, means on the door providing a pair of actuator supports spaced from relatively opposite sides of a plane through the longitudinal axis of the valve cylinder, and a manually operable valve actuator pivotally mounted on the actuator supports and engaging the valve member to slide the same in the cylinder, the improvement comprising: said actuator supports having aligned bearing openings therein, said valve actuator including a first shaft member shorter than the spacing between said actuator supports and having a first pivot portion adjacent one end rotatably received in the bearing opening in one of said actuator supports and an actuator portion integral with and extending laterally of the first shaft member adjacent its other end for engagement with the valve member, said valve actuator including a second shaft member having a second pivot portion intermediate its ends rotatably received in the bearing opening in the other of said actuator supports when one end thereof is adjacent said other end of the first shaft member and a handle portion integral with and extending laterally of the other end of the second shaft member, and shaft connecting means on the adjacent ends of said first and second shaft members for detachably and non-rotatably interconnecting the first and second shaft members in a plurality of different angular positions relative to each other for turning in unison.

2. A freezer door according to claim 1 wherein said shaft connecting means comprises an internally splined socket in one of said shaft members and an externally splined end portion on the other of said shaft members smaller in corss section than the pivot portion on said second shaft member and extending into said socket and arranged to non-rotatably interconnect the first and second shaft members in a plurality of different angular positions relative to each other.

3. A freezer door according to claim 1 wherein said shaft connecting means comprises an internally splined socket in said other end of said first shaft member and an externally splined end portion on said one end of said second shaft member smaller in cross section than the pivot portion on the second shaft member and extending into said socket and arranged to nonrotatably interconnect the first and second shaft members in a plurality of different angular positions relative to each other.

4. A soft-serve freezer according to claim 1 wherein said bearings have a like internal diameter and said pivot portions of said first and second shaft members have a like outer diameter to enable end-for-end reversible mounting of the first and second shaft members in the bearings on the spaced actuator supports for left or right hand operation of the handle.

5. In a freezer door for a soft-serve freezer including a valve cylinder in the door having a product inlet and a product outlet, a valve member slidable in the valve cylinder to control flow from the product inlet to the product outlet, means on the door providing a pair of actuator supports spaced from relatively opposite sides of a plane through the longitudinal axis of the valve cylinder, and a manually operable valve actuator pivotally mounted on the actuator supports and engaging the valve member to slide the same in the cylinder, the improvement comprising: said actuator supports having aligned bearing openings therein, said valve actuator including a first shaft member shorter than the spacing between said actuator supports having a first pivot portion adjacent one end rotatably received in the bearing opening in one of said actuator supports and an actuator portion integral with and extending laterally of the first shaft member adjacent its other end for engagement with the valve member, said valve actuator including a second shaft member having a second pivot portion intermediate its ends rotatably received in the bearing opening in the other of said actuator supports when one end thereof is adjacent said other end of the first shaft member and a handle portion integral with and extending laterally of the other end of the second shaft member, shaft connecting means including an internally splined socket in said other end of said first shaft member and an extennally splined end portion of said one end of said second shaft member smaller in cross section than the pivot portion on the second shaft member and extending into said socket and arranged to detachably and non-rotatably interconnect the first and second shaft members in a plurality of different angular positions relative to each other, said bearings having a like internal diameter and said pivot portions of said first and second shaft members having a like outer diameter to enable end-for-end reversible mounting of the first and second shaft members in the bearings on the spaced actuator supports for left or right hand operation of the handle.

* * * * *

UNITED STATES PATENT AND TRADEMARK OFFICE
CERTIFICATE OF CORRECTION

PATENT NO. : 4,203,461
DATED : May 20, 1980
INVENTOR(S) : Stephen W. Schwitters

It is certified that error appears in the above-identified patent and that said Letters Patent are hereby corrected as shown below:

Claim 2, column 5, line 32, "corss" should be -- cross --;

Claim 5, column 6, line 34, "extennally" should be -- externally --.

Signed and Sealed this

Twenty-ninth Day of July 1980

[SEAL]

Attest:

SIDNEY A. DIAMOND

Attesting Officer

Commissioner of Patents and Trademarks